United States Patent [19]

Usumi et al.

[11] Patent Number: 5,557,604
[45] Date of Patent: Sep. 17, 1996

[54] CELL DELAY ABSORBING CIRCUIT

[75] Inventors: Motoharu Usumi; Takaya Yamamoto, both of Kawasaki, Japan

[73] Assignee: Fujitsu Limited, Kanagawa, Japan

[21] Appl. No.: 290,474

[22] Filed: Aug. 15, 1994

[30] Foreign Application Priority Data

Feb. 4, 1994 [JP] Japan .................. 6-012416

[51] Int. Cl.⁶ .................................. H04J 3/14
[52] U.S. Cl. .................. 370/17; 370/60; 370/94.1
[58] Field of Search ...................... 370/60, 61, 13, 370/17, 94.1, 58.1–58.3, 60.1, 100.1, 105.1, 105.2, 108

[56] References Cited

U.S. PATENT DOCUMENTS 5,140,584  8/1992  Suzuki ........................ 370/60
5,365,519 11/1994  Kozaki et al. ................ 370/60
5,381,408  1/1995  Brent et al. ................. 370/60

FOREIGN PATENT DOCUMENTS 4-294654 10/1992 Japan.

*Primary Examiner*—Benedict V. Safourek
*Assistant Examiner*—Ajit Patel

[57] ABSTRACT

A device for receiving cells with varying time delays and for reconstructing a continuous signal from a sequence of the cells includes a delay absorbing unit for receiving, temporarily storing, and sending cells after absorbing a variation in time delays of the cells, a cell disassembling unit for reconstructing the continuous signal by processing the cells sent from the delay absorbing unit, and a cell counting unit for counting a number of the cells stored in the delay absorbing unit, wherein the cell disassembling unit starts processing a new cell when the number exceeds a predetermined number, so that a time delay of the continuous signal can be reduced.

7 Claims, 8 Drawing Sheets

F I G. 2
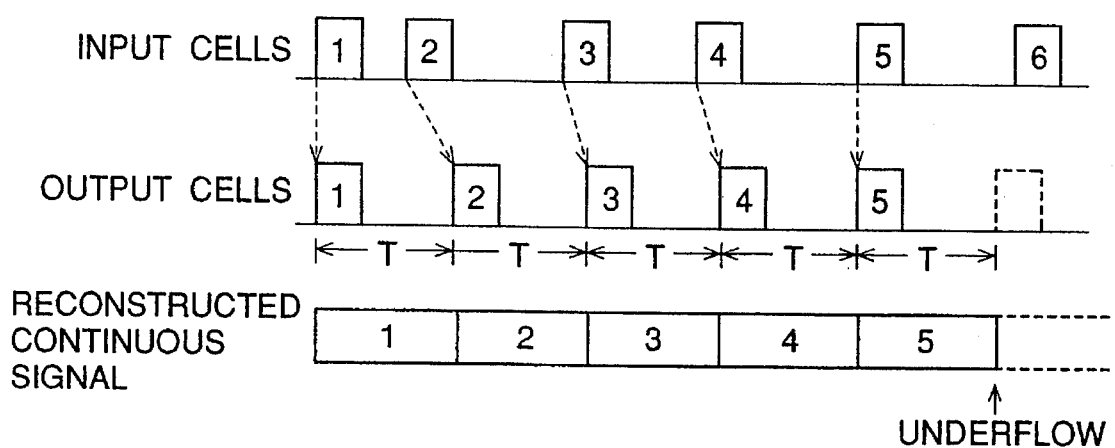

CELL DELAY ABSORBING CIRCUIT

BACKGROUND OF THE INVENTION

1. Field of the Invention

The present invention relates to a cell delay absorbing circuit for absorbing delays of cells caused by passing through an ATM (Asynchronous Transfer Mode) network.

2. Description of the Prior Art

A schematic diagram of a circuit of the prior art for absorbing cell delays which cells experience by passing through an ATM network is shown in FIG. 1. First, a continuous signal input to a cell assembling device 1 is divided therein into payloads of cells, which are attached with a cell header and sent out to an ATM network 2 at equal intervals T. After experiencing delays at nodes of the ATM network 2 by queuing, those cells arrive at a delay absorbing buffer 3 at varying intervals.

The cells stored in the delay absorbing buffer 3 are read out at equal intervals T to be provided for a cell disassembling device 4. The cell disassembling device 4 extracts payloads from the cells and connects them together to reconstruct the original continuous signal. The reconstructed signal is a continuous signal output of the cell disassembling device 4.

FIG. 2 is a time chart of the circuit of the prior art showing relationship between input cells and output cells. Here, a fixed-length time delay such as the transfer delay of the ATM network 2 is assumed to be zero for convenience of explanation.

Cells with varying intervals as shown at the top of FIG. 2 are provided for the delay absorbing buffer 3. By starting the reading out of cells upon the arrival of the first cell at the delay absorbing buffer 3, intervals between output cells can be made equal as shown in the middle of FIG. 2. The cell disassembling device 4 is provided with the cells with equal intervals T to reconstruct a continuous signal as shown at the bottom of FIG. 2.

Starting the reading out of cells upon the arrival of the first cell at the delay absorbing buffer 3 can bring about a situation where there are no cells to read out from the delay absorbing buffer 3, which is referred to as an underflow situation meaning that a cell to be reconstructed has not yet arrived. This situation can be seen with regard to a cell 6 in FIG. 2. In this case, information contained in the cell 6 is lost.

In order to circumvent such a situation, the reading out of cells can be started upon the arrival of a k+1th cell at the delay absorbing buffer, k being a minimum integer which satisfies, $$kT \geq Dmax \tag{1}$$

where Dmax is the maximum possible delay caused in the network, and T is a time interval between cells sent out from the cell assembling device 1, i.e., a time interval between cells read out from the delay absorbing buffer 3. This is described in the Japanese Patent Laid Open Application No.4-294654.

Although underflowing can be prevented with this method, an initial delay Din will persist. The initial delay Din is the time difference in the reading out of the first cell from the delay absorbing buffer 3 between this method and an ideal situation in which there would be no delays of cells.

FIG. 3 is a time chart showing another example of the operation of the circuit of the prior art. FIG. 3 is shown with regard to the case where k is equal to 2. In FIG. 3, a first row shows a cell sequence without varying delays, a second row shows a cell sequence input to the delay absorbing buffer 3, a third row shows a cell sequence output from the delay absorbing buffer, a fourth row shows a reconstructed continuous signal, and a fifth row shows the number of cells stored in the delay absorbing buffer 3. As shown in the fourth row of FIG. 3, a continuous signal can be reconstructed without losing any cells by starting the reading out of cells at intervals T upon the arrival of the third cell (i.e., k+1) indicated by "*" in FIG. 3.

However, having the initial delay time Din cannot be avoided as shown in FIG. 3. Furthermore, the initial delay time Din cannot be reduced in order for the continuous signal to catch up with the arrival of following cells, even when the following cells arrive without any delays at the delay absorbing buffer 3.

Accordingly, there is a need in the field of cell delay absorbing circuits for a cell delay absorbing circuit which can prevent the occurrence of underflowing and, at the same time, reduce a time delay as much as possible.

SUMMARY OF THE INVENTION

Accordingly, it is a general object of the present invention to provide a cell delay absorbing circuit which satisfies the need described above.

It is another and more specific object of the present invention to provide a cell delay absorbing circuit which can prevent the occurrence of underflowing and can reduce a time delay as much as possible.

In order to achieve the above objects, according to the present invention, a device for receiving cells with varying time delays and for reconstructing a continuous signal from a sequence of the cells includes a delay absorbing unit for receiving, temporarily storing, and sending cells after absorbing a variation in time delays of the cells, a cell disassembling unit for reconstructing the continuous signal by processing the cells sent from the delay absorbing unit, and a cell counting unit for counting a number of the cells stored in the delay absorbing unit, wherein the cell disassembling unit starts processing a new cell when the number exceeds a predetermined number, so that the time delay of the continuous signal can be reduced.

According to the present invention, the device can start processing a new cell to reconstruct the continuous signal when a cell arrives at the delay absorbing unit ahead of schedule for the cell disassembling unit to process the cells. Thus, the device can reduce the time delay of reconstruction of the continuous signal when such reduction is possible.

Other objects and further features of the present invention will be apparent from the following detailed description when read in conjunction with the accompanying drawings.

BRIEF DESCRIPTION OF THE DRAWINGS

FIG. 2 is a time chart showing the operation of the cell delay absorbing circuit of FIG. 1;

DESCRIPTION OF THE PREFERRED EMBODIMENTS

First, a brief description will be given of embodiments of the present invention.

Figure 1:
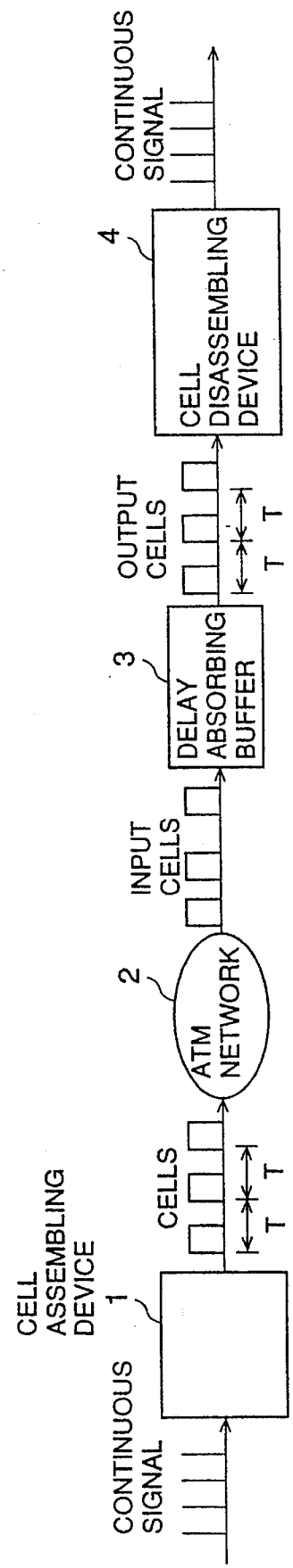
FIG. 1 is a schematic diagram of a cell delay absorbing circuit of the prior art.
Figure 3:
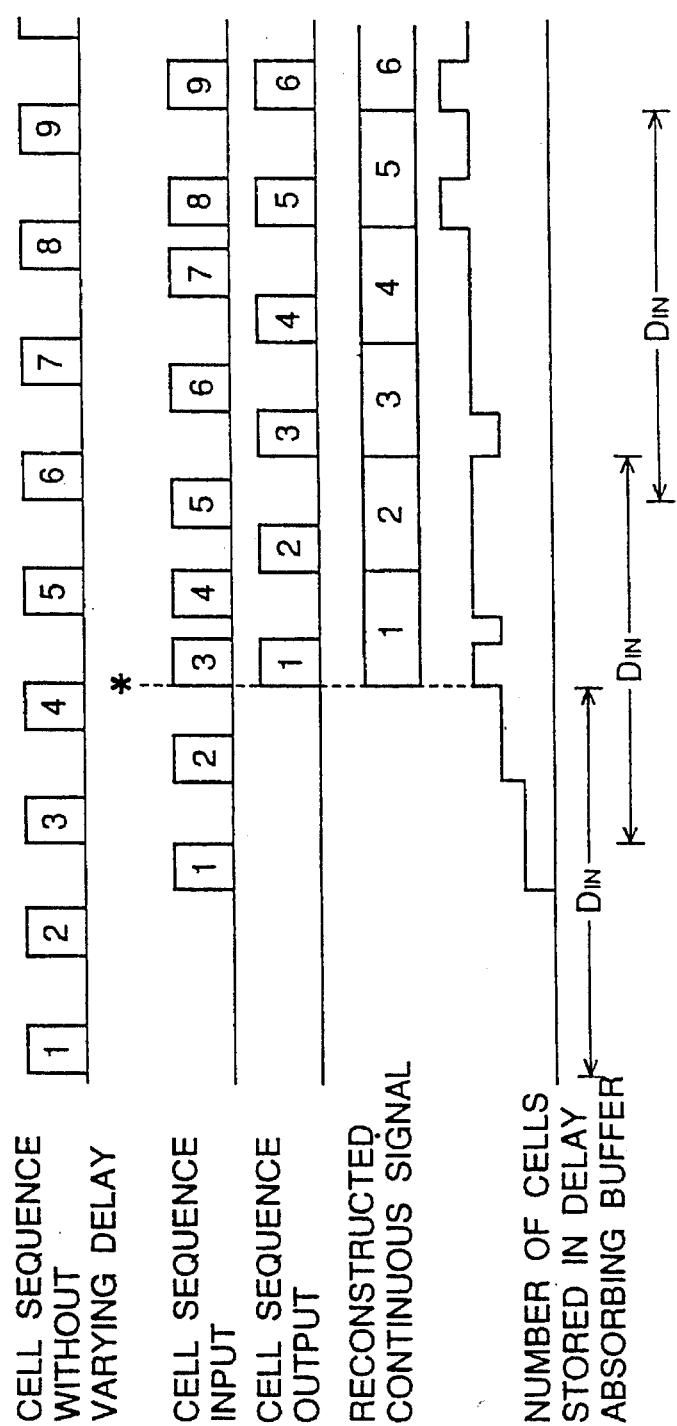
FIG. 3 is a time chart showing another operation of the cell delay absorbing circuit of FIG. 1.
Figure 4:
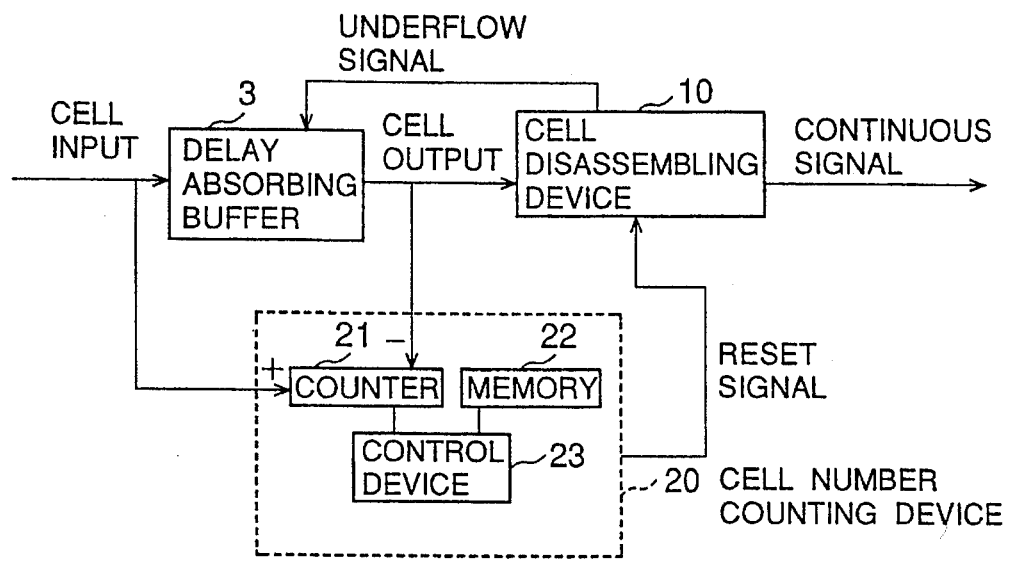
FIG. 4 is a block diagram of a cell delay absorbing circuit according to a first embodiment of the present invention.

FIG. 4 is a block diagram of a first embodiment. The same elements as in FIG. 1 are referred to by the same numerals.

In FIG. 4, a cell delay absorbing circuit according to the first embodiment includes a delay absorbing buffer 3 for receiving and storing cells and absorbing a variation in cell delays. The cell delay absorbing circuit further includes a cell disassembling device 10 for receiving the output of the delay absorbing buffer 3 to reconstruct an original continuous signal from the cells and for sending an underflow signal to the delay absorbing buffer 3 when there is no cell to disassemble. The cell delay absorbing circuit further includes a cell number counting device 20 for counting the number of cells stored in the delay absorbing buffer 3 by using the cell input and the cell output of the delay absorbing buffer 3 and for sending a reset signal to the cell disassembling device 10 when the number of cells exceeds a predetermined limit.

In the first embodiment, the cell disassembling device 10 sends an underflow signal each time it completes the disassembling of one cell so as to request the delay absorbing buffer 3 to transfer the next cell. The cell number counting device 20 sends a reset signal to the cell disassembling device 10 when the number of cells stored in the delay absorbing buffer 3 exceeds a predetermined limit. Upon receiving the reset signal, the cell disassembling device 10 discards a cell being processed, provides an underflow signal for the delay absorbing buffer 3 to request the transfer of the next cell. In the manner described here, a delay is reduced with the disposal of a cell under process when the number of cells stored in the delay absorbing buffer 3 exceeds the predetermined limit, and the delay absorbing buffer 3 is requested to send out the next cell. For such a redundant signal as a voice signal which can be partly discarded, a delay can be reduced as much as possible while preventing the occurrence of underflow.

Figure 5:
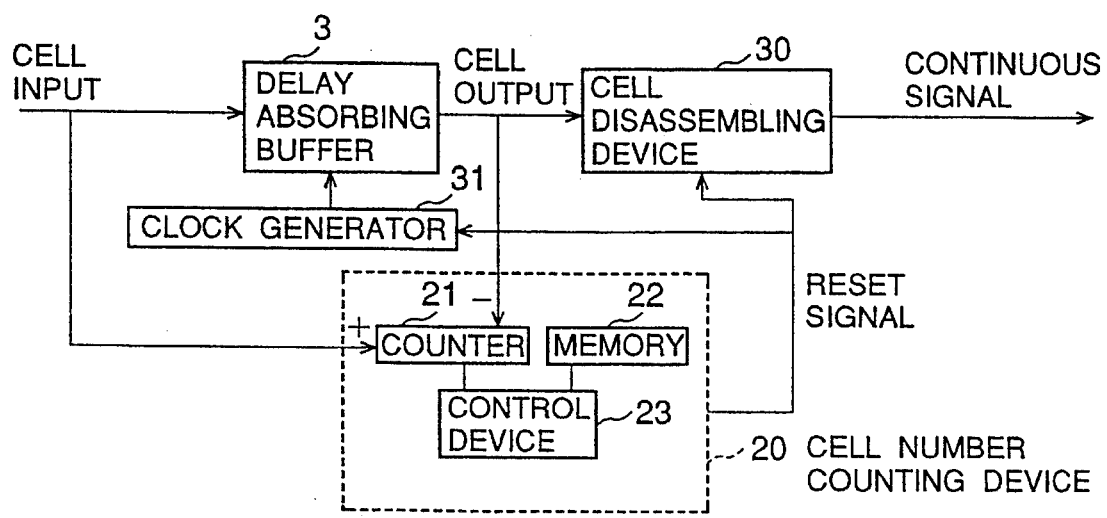
FIG. 5 is a block diagram of a cell delay absorbing circuit according to a second embodiment of the present invention.

In FIG. 5, a cell delay absorbing circuit according to the second embodiment includes a delay absorbing buffer 3 for receiving and storing cells and absorbing a variation in cell delays. The cell delay absorbing circuit further includes a cell disassembling device 30 for receiving the output of the delay absorbing buffer 3 to reconstruct an original continuous signal from the cells, and a clock generator 31 for providing a clock signal for the delay absorbing buffer 3 in order to read out cells at equal intervals. The cell delay absorbing circuit further includes a cell number counting device 20 for counting the number of cells stored in the delay absorbing buffer 3 by using the cell input and the cell output of the delay absorbing buffer 3 and for sending a reset signal to the cell disassembling device 30 and to the clock generator 31 when the number of cells exceeds a predetermined limit.

In the second embodiment, the delay absorbing buffer 3 is requested to transfer the next cell not by an underflow signal from the cell disassembling device 30 but by a clock signal provided by the clock generator 31. The cell number counting device 20 sends a reset signal to the cell disassembling device 30 and the clock generator 31 when the number of cells stored in the delay absorbing buffer 3 exceeds a predetermined limit. Upon receiving the reset signal, the cell disassembling device 30 discards a cell being processed. The clock generator 31 is cleared by the reset signal to provide a next clock pulse for the delay absorbing buffer 3 to request the transfer of the next cell. In the manner described here, a delay is reduced with the disposal of a cell being processed when the number of cells stored in the delay absorbing buffer 3 exceeds the predetermined limit, and the delay absorbing buffer 3 is requested to send out the next cell. For such a redundant signal as a voice signal which can be partly discarded, a delay can be reduced as much as possible while preventing the occurrence of underflow.

In the following, the first and second embodiments of the present invention will be described in further detail.

As described above, in the present invention, a delay caused in an ATM network can be reduced, while having a communication, by examining the number of cells stored in the delay absorbing buffer 3. However, since a cell being processed is discarded in reducing a delay, it might cause a problem in the reliability of reconstructed signals. Thus, a timer is provided in the cell number counting device 20 so as to restrict the period of time in which a reduction of delay by the reset signal is carried out. By limiting this time period to be a predetermined length from the start of communication, the disposal of a cell which contains important information can be prevented.

Figure 6:
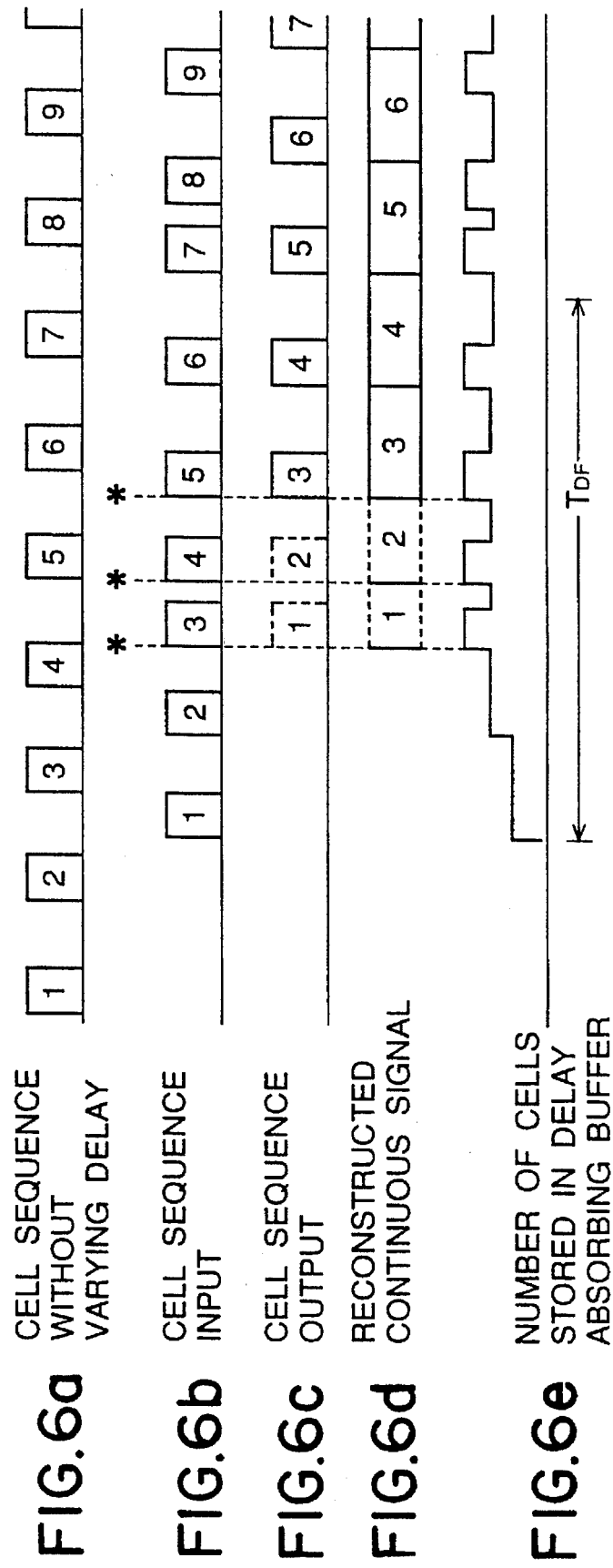
FIG. 6 is a time chart showing the operation of the cell delay absorbing circuit according to the present invention.

FIG. 6 is a time chart showing the operation of a cell delay absorbing circuit according to the present invention. In FIG. 6, a first row shows a cell sequence without varying delays, a second row shows a cell sequence input, a third row shows a cell sequence output, a fourth row shows a reconstructed continuous signal, and a fifth row shows the number of cells stored in the delay absorbing buffer 3. FIG. 6 shows a case of k=2. Points of time where a reset occurs are indicated by "*" marks.

In FIG. 6, the arrival of a third cell 3 at the delay absorbing buffer 3 works as a trigger to start the disassembling of the cells. Since a cell 4 arrives during the reconstruction of the cell 1 and the number of cells stored in the delay absorbing buffer 3 becomes 3 (equal to k+1), the cell number counting device 20 sends a reset signal to the cell disassembling device 10 (or 30). The cell disassembling device 10 (or 30) stops the reconstruction of the cell 1 to start the reconstruction of the next cell 2 sent from the delay absorbing buffer 3. In the same manner, the reconstruction of the cell 2 is stopped upon the arrival of a cell 5.

At the same time, checks on the timer start at the arrival of the first cell so that the reconstruction of a cell being processed is not stopped even when there are more than three cells in the delay absorbing buffer 3 once a predetermined length of time Tdf has passed. That is, there are 3 cells in the delay absorbing buffer 3 at the arrival of a cell 8, but the reconstruction of the cell 5 is not discarded since the predetermined length of time Tdf has passed by that time. As a result, a reconstructed continuous signal has cells 1 and 2 discarded and cell 3 and the following cells reconstructed as shown in the fourth row of FIG. 6.

Figure 7:
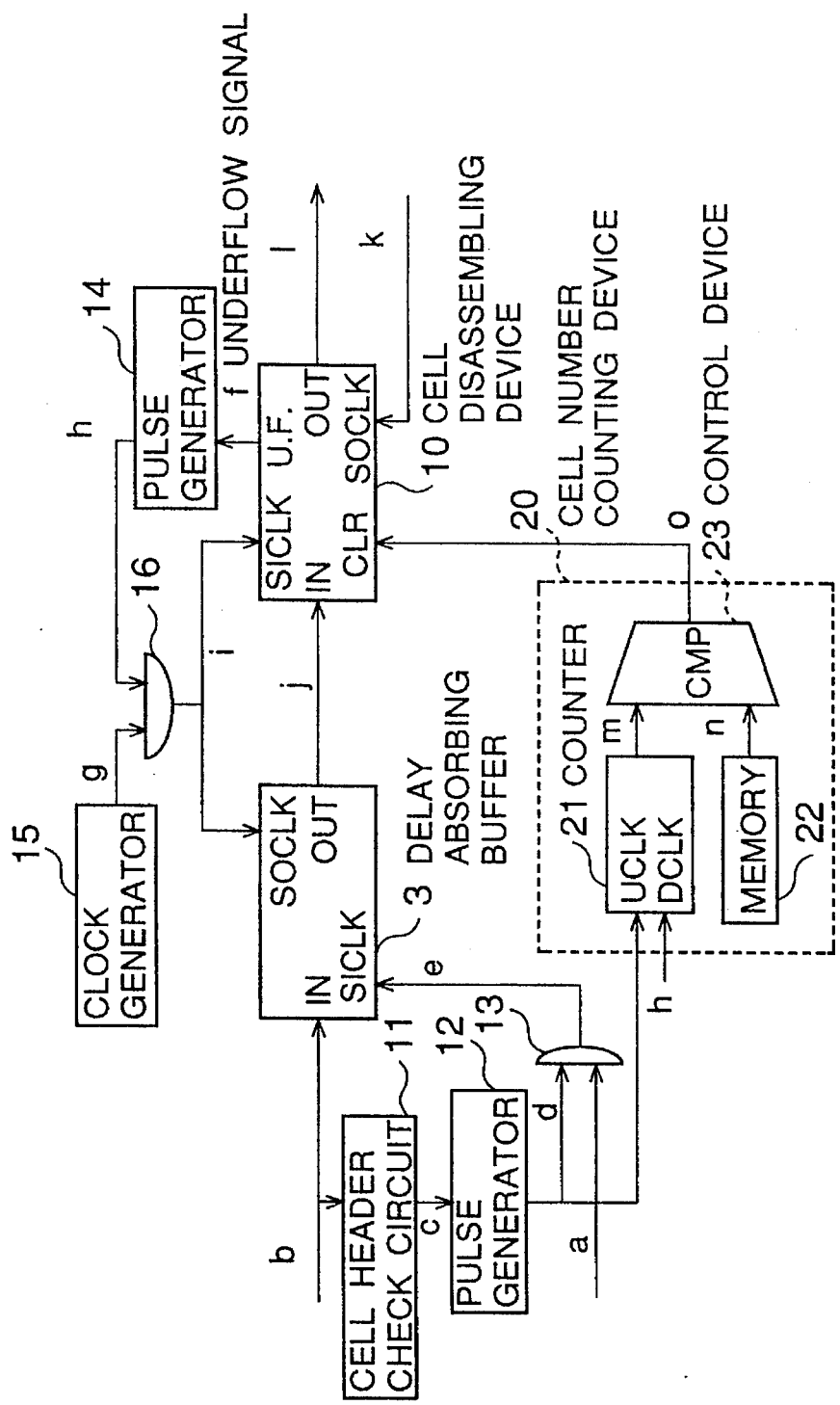
FIG. 7 is a block diagram of a cell delay absorbing circuit according to the first embodiment of the present invention.

FIG. 7 is a block diagram of a structure of a cell delay absorbing circuit according to the first embodiment of the present invention. The same elements as in FIG. 4 are referred to by the same numerals. In FIG. 7, the delay absorbing buffer 3 is a type of FIFO (First In First Out) buffer. Also, the cell disassembling device 10 which receives the output of the delay absorbing buffer 3 is a type of FIFO buffer. The cell number counting device 20 includes an up-down counter 21 (hereinafter referred to as a counter), a memory 22 for storing a constant k+1, and a control device 23. A comparator may be used as the control device 23, for example.

A cell header check circuit 11 detects cell headers of input cells, and a pulse generator generates a clock pulse by using the output of the cell header check circuit 11 as a trigger. An AND gate 13 receives an input clock a and an output d of the pulse generator 12. An output e of the AND gate 13 is an input to the delay absorbing buffer 3 at the shift clock input (SICLK).

Of a counter 21, the up-count input UCLK is provided with an output clock of the pulse generator 12, and the down-count input DCLK with a timing pulse h (described later). A reset signal o, which is the output of the control device 23, is applied to the reset input CLR of the cell disassembling device 10.

A pulse generator 14 generates a pulse signal upon receiving an underflow signal f from the cell disassembling device 10. A clock generator 15 generates a clock signal, and an AND gate 16 receives an output h of the pulse generator 14 and an output g of the clock generator 15. An output i of the AND gate 16 is provided for the delay absorbing buffer 3 as a read-out clock and for the cell disassembling device 10 as a read-in clock. In the cell disassembling device 10, k is a continuous signal clock, and is a continuous signal output.

For the sake of simplicity of explanation, assume that a cell is comprised of a 1-bit header and 4 bits of information for expressing a continuous signal, the minimum integer k satisfying kT≧Dmax is 2, and the memory 22 holds a value of 3 (equal k+1).

Figure 8:
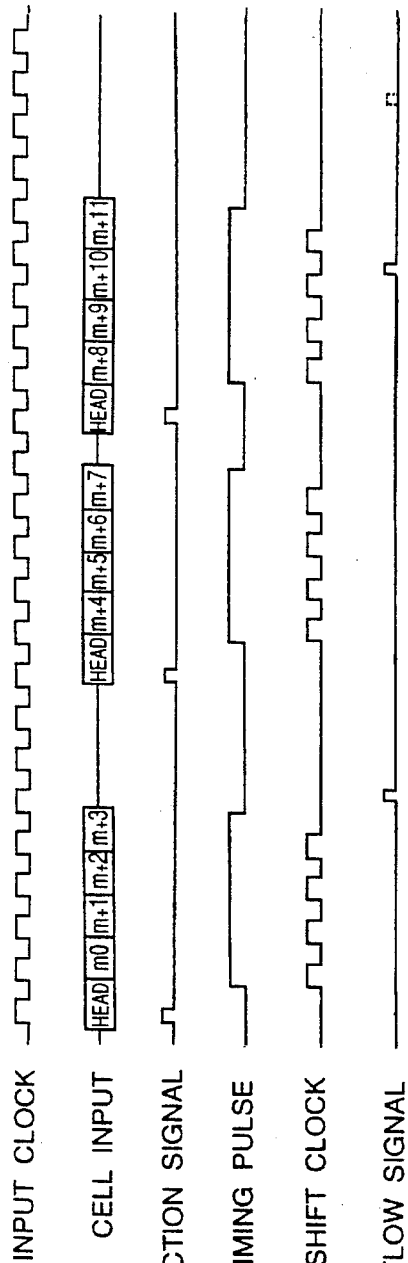
FIG. 8 is a time chart showing the operation of the cell delay absorbing circuit of FIG. 7.

A description of the operation of the circuit of FIG. 7 will be given with reference to FIG. 8, which is a time chart of each signal of FIG. 7. Shown in FIG. 8 are the input clock a, a cell input b, a cell detection signal c, the first timing pulse d, the first shift clock e, the underflow signal f, the transfer clock g, the second timing pulse h, the second shift clock i, a cell output j, the continuous signal clock k, the continuous signal 1, a counter result m, a memory value n, and the reset signal o of FIG. 7.

The cell header check circuit 11 detects headers of cells by examining the cell input b to provide the cell detection signal c. The pulse generator 12 using the cell detection signal c as a trigger generates the first timing pulse d for separating information on a continuous signal contained in each payload of the cell input b.

The AND gate 13 receives the first timing pulse d and the input clock a, and provides the first shift clock e for the delay absorbing buffer 3. The first shift clock e is comprised of 4 pulses so that the delay absorbing buffer 3 extracts and stores four bits m0 through m3 of the cell input b.

The cell output j which is read out from the delay absorbing buffer 3 by the second shift clock i is acquired in the cell disassembling device 10 by the same clock. Information acquired in the cell disassembling device 10 is transformed to the continuous signal 1 by the continuous signal clock k.

When the cell disassembling device 10 completes the generation of the continuous signal 1 and there is no more information therein to be processed, the cell disassembling device 10 generates the underflow signal f. This situation is shown in FIG. 8 at a point where the continuous signal 1 starts sending out m-5. Then, by using the underflow signal f as a trigger, the pulse generator 14 generates the second timing pulse h, which has a time length corresponding to that of one cell (four bits).

The AND gate 16 calculates a logical product between the second timing pulse h and the transfer clock g generated by the clock generator 15 to produce the second shift clock i. In synchronism with the second shift clock i, the delay absorbing buffer 3 provides the four bits of m-4 through m-1 in the cell output j. At the same time, the cell disassembling device 10 stores the cell of those four bits in synchronism with the second shift clock i.

The counter 21, which is used for counting the number of cells stored in the delay absorbing buffer 3, is counted up by the first timing pulse d and counted down by the second timing pulse h. The control device 23 makes a comparison of the output of the counter 21 with the value of 3 stored in the memory 22. When the output of the counter 21 becomes 3, the control device 23 generates the reset signal o.

Upon receiving the reset signal o, the cell disassembling device 10 discards information about m-1 stored therein, and generates the underflow signal f. By doing so, the cell disassembling device 10 can generate the underflow signal f ahead of schedule, according to which an underflow signal f would be generated at a point indicated by a dotted line in FIG. 8. Thus, subsequent information appears in the continuous signal 1 ahead of schedule by one bit. This means a recovery from delay by one bit.

As described above, according to the first embodiment of the present invention, a cell delay absorbing circuit according to the first embodiment includes the delay absorbing buffer 3 for receiving and storing cells and absorbing a variation in cell delays. The cell delay absorbing circuit further includes the cell disassembling device 10 for receiving the output of the delay absorbing buffer 3 to reconstruct an original continuous signal from the cells and for sending an underflow signal to the delay absorbing buffer 3 when there is no cell to disassemble. The cell delay absorbing circuit further includes the cell number counting device 20 for counting the number of cells stored in the delay absorbing buffer 3 by using the cell input and the cell output of the delay absorbing buffer 3 and for sending a reset signal to the cell disassembling device 10 when the number of cells exceeds a predetermined limit.

Figure 9:
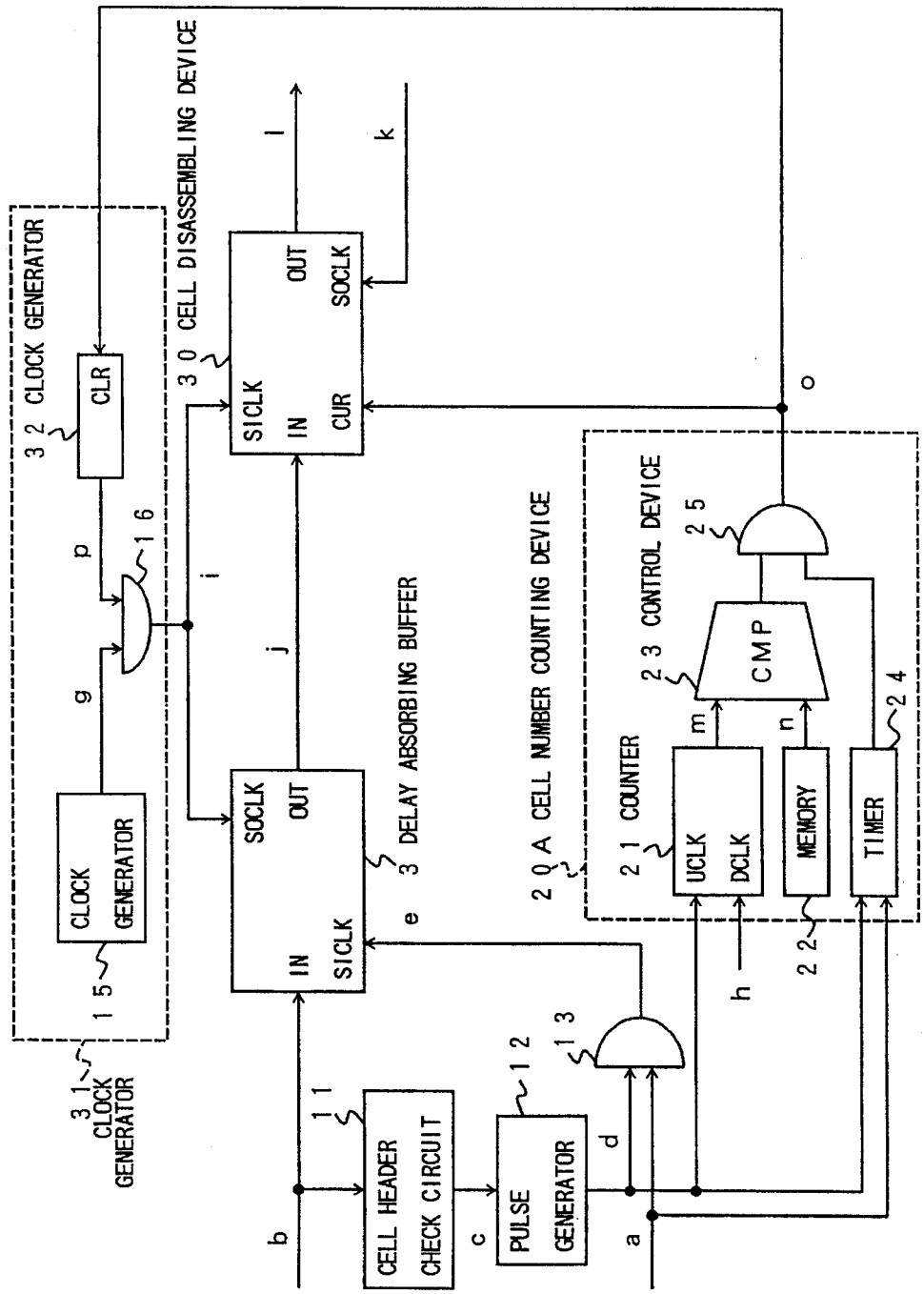
FIG. 9 is a block diagram of a cell delay absorbing circuit according to the second embodiment of the present invention.

FIG. 9 shows a detailed block diagram of the second embodiment according to the present invention. FIG. 9 differs from FIG. 7 only in a cell number counting device 20A, a cell disassembling device 30, and a clock generator 31.

The cell number counting device 20A of FIG. 9 includes an added timer 24 for measuring the predetermined time period Tdf described earlier. The timer 24 receives the output d of the pulse generator 12 and the input clock a, and starts counting time upon receiving the first pulse from the pulse generator 12 by using the input clock a as a reference signal. The timer 24 keeps its output at a high level during the predetermined time period Tdf from the start of counting. Then, this output becomes zero after the passing of the predetermined time period Tdf. The cell number counting device 20A further includes an AND gate 25 so that the output of the control device 23 can go through the AND gate 25 only during the predetermined time period Tdf.

The timer 24 can be added to the cell number counting device 20 of FIG. 7, and does not constitute the difference between the first embodiment and the second embodiment.

The cell disassembling device 30 does not provide an underflow signal, and, except for this point, is the same as that of FIG. 7.

The clock generator 31 includes a clock generator 32 replacing the pulse generator 14, but its output signal p plays almost the same role as the second timing pulse h of FIG. 8. The only difference is that the output signal p is clock pulses at equal intervals, while the second timing pulse h is pulses each generated upon a request from the cell disassembling device 30.

When there are more than a predetermined number of cells stored in the delay absorbing buffer 3, the reset signal o resets the clock generator 31 and the cell disassembling device 30. Thus, the cell disassembling device 30 discards a cell being processed, and receives a new cell from the delay absorbing buffer 3 by using the second shift clock i. This reset process is effective only during the predetermined time period Tdf from the arrival of a first cell at the delay absorbing buffer 3.

Thus, the second embodiment according to the present invention can provide a cell delay absorbing circuit which can prevent underflow and reduce the delay as much as possible, having an significant advantage for practical purposes.

Further, the present invention is not limited to these embodiments, but various variations and modifications may be made without departing from the scope of the present invention.

What is claimed is:

1. A device for receiving cells with varying time delays and for reconstructing a continuous signal from a sequence of the cells, said device comprising:

delay absorbing means for receiving cells, temporarily storing said cells, and outputting said cells at scheduled equal intervals after absorbing a variation in time delays of said cells;

cell disassembling means for receiving and reconstructing a continuous signal by processing said cells outputted from said delay absorbing means; and cell counting means for counting a number of cells stored in said delay absorbing means and sending to said cell disassembling means a reset signal when said counted number of the cells exceeds a predetermined number;

said cell disassembling means, upon receiving said reset signal, discarding a cell being processed and sending to said delay absorbing means a request for a new cell so that said delay absorbing means sends to said cell disassembling means one of said cells upon receipt of said request ahead of said scheduled equal intervals and said cell disassembling means starts processing the new cell when said counted number of the cells exceeds said predetermined number, thereby reducing a time delay of said continuous signal.

2. The device as claimed in claim 1, wherein said cell counting means comprises:

counting means for counting up when said delay absorbing means receives one cell and for counting down when said delay absorbing means sends one cell;

memory means for storing said predetermined number; and comparison means for comparing a counting result of said counting means with said predetermined number stored in said memory means and for sending said signal when said counting result and said predetermined number are the same.

3. The device as claimed in claim 1, further comprises clock means for generating a clock signal used for reading out the cells from said delay absorbing means.

4. The device as claimed in claim 3, wherein said clock means is reset to start reading out said new cell from said delay absorbing means when said counted number of the cells exceeds said predetermined number.

5. The device as claimed in claim 4, wherein said cell counting means also sends said reset signal to said clock means when said counted number of the cells exceeds said predetermined number, so that said clock means is reset.

6. The device as claimed in claim 5, wherein said cell counting means comprises:

counting means for counting up when said delay absorbing means receives one cell and for counting down when said delay absorbing means sends one cell;

memory means for storing said predetermined number; and comparison means for comparing a counting result of said counting means with said predetermined number stored in said memory means and for sending said signal when said counting result and said predetermined number are the same.

7. The device as claimed in claim 1, further comprising timer means for measuring a predetermined time period from the arrival of a first cell at said delay absorbing means, wherein a time delay of said continuous signal is reduced only during said predetermined time period.

* * * * *